Patented Oct. 5, 1954

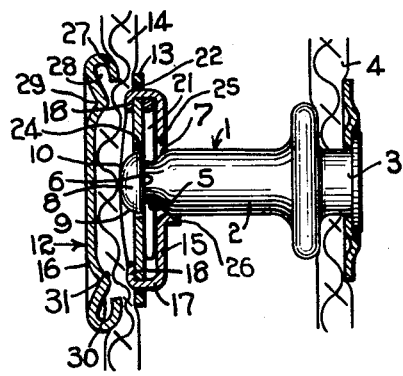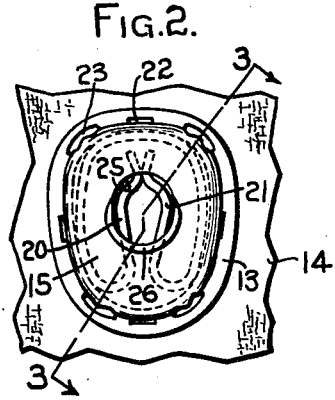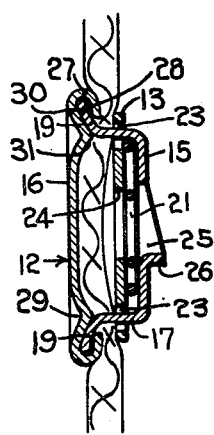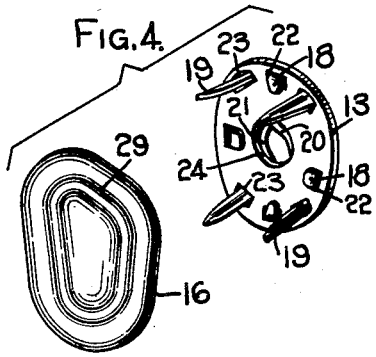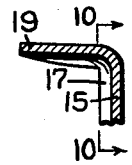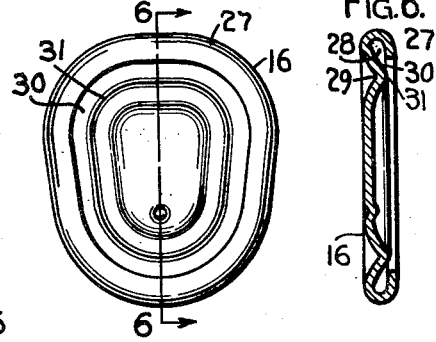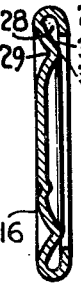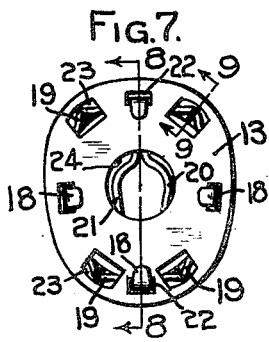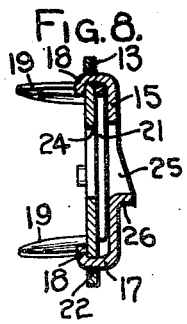

2,690,604

UNITED STATES PATENT OFFICE 2,690,604

SNAP FASTENER SOCKET ASSEMBLY

Walter I. Jones, Belmont, Mass., assignor to United-Carr Fastener Corporation, Cambridge, Mass., a corporation of Massachusetts Application September 18, 1950, Serial No. 185,379

1 Claim. (Cl. 24—216)

This invention relates to separable snap fasteners of the three-side lock type, and aims generally to improve the construction and operation of snap fasteners of this type.

A primary object of the invention is the provision of a separable stud and socket snap fastener assembly of improved construction and operation which may be economically manufactured and assembled.

A further object of the invention is the provision of a snap fastener assembly in which the stud and socket may be readily engaged and disengaged and in which the fastener may be very firmly secured to its carrying fabric by simple and inexpensive securing means.

A further object of the invention is the provision of an improved and simplified socket construction for three-side lock snap fasteners having greater holding power than prior socket constructions of this type.

Another object of the invention is the provision of an improved clench plate for the socket of a separable snap fastener providing improved means for attaching the socket to a carrying fabric.

These and other aims and advantages of the invention will be apparent to persons skilled in the art to which the invention relates from a consideration of the accompanying drawings and annexed specification illustrating and describing a preferred form of the invention.

In the drawings—

Fig. 1 is a vertical cross-sectional view of the improved snap fastener assembly according to the invention;

Fig. 2 is a rear elevation of the socket member;

Fig. 3 is a cross-sectional view of the socket member taken on the line 3—3 of Fig. 2;

Fig. 4 is an exploded view of the parts of the socket assembly between which the supporting material is held;

Fig. 5 is a rear view of the clench plate;

Fig. 6 is a cross-sectional view of the clench plate taken on the line 6—6 of Fig. 5;

Fig. 7 is a rear view of the spring jaw carrying assembly;

Fig. 8 is a cross-sectional view taken on the line 8—8 of Fig. 7;

Fig. 9 is a view in section taken on line 9—9 of Fig. 7 omitting the plate member; and Fig. 10 is a view in section taken on line 10—10 of Fig. 9.

The drawings illustrate a preferred embodiment of the invention comprising a stud 1 and a cooperating socket 12. The stud 1 comprises a cylindrical body portion 2. This stud may be formed hollow from sheet metal or of solid stock and is provided at its inner end with suitable means 3 for attachment to an inner carrying part 4, herein shown as a sheet of flexible material such as canvas or the like. Adjacent its outer end the body portion 2 is provided with a peripheral groove 5, one side of said groove forming an annular inwardly facing substantially right angular locking shoulder 6, and the other side of said groove forming an outwardly facing beveled jaw spreading shoulder 7.

The body portion 2 outwardly of the groove 5 forms a head portion 8 which is rounded at 9 to facilitate assembly of the stud with the socket. The head 8 is preferably of the pancake type as shown at 10 so that there will be a minimum projection thereof into the material which carries the socket and also a minimum of interference to permit separation from a socket at the opening side even though the fastener becomes clogged with mud.

The socket 12 includes a central plate 13 which is seated on the inner side of an outer carrying fabric 14, and two outer plates 15 and 16 at opposite sides of the central plate. The plate 15 is at the inner side of the carrying part 14, and is herein designated the rear plate, while the plate 16 is seated on the outer side of the carrying part and is herein designated the front or clench plate.

The plate 15 is provided with a narrow marginal flange 17 on which are formed shorter prongs 18 and longer prongs 19. The flange 17 is seated on one side of the central plate 13 and in conjunction therewith and with the plate 15 forms a casing in which are confined the resilient wire jaws 20 and 21 adapted to spring into engagement with the stud shoulder 6 and lock the socket member to the stud. The shorter prongs 18 pass through slots 22 in the central plate 13 and are clenched on one side thereof to hold the plates 13 and 15 in assembly, as shown more clearly in Figs. 4, 7 and 8. The longer prongs 19 pass through slots 23 in the central plate, thence through the carrying part 14, and are clenched in the front plate 16.

The plates 13 and 15 are apertured, as at 24 and 25, to receive the stud member 1. The aperture 24 in the plate 13 is preferably formed to somewhat closely fit and embrace the head portion of the stud member so as to accurately locate the socket member with relation thereto when the two are engaged. The aperture 25 is preferably of a width only slightly greater than the diameter of the head portion 8 of the stud and of a length somewhat greater than its width to permit relative tipping movement between the stud and socket for wedging the jaws 20 and 21 apart to release the stud from the socket. An arcuate curb 26 extends outwardly from the plate 15 around a portion of the aperture 25 and functions as a guide and bearing for the stud and to prevent wear of that portion of the stud held in contact with the wall of the aperture 25 by the spring jaws 20 and 21 and to help lock the stud and socket against separation at three sides. The front or clench plate 16 provides an improved construction over those generally used for this purpose and has an increased gripping and holding action not obtainable with the old types. Heretofore it has been the usual practice to provide the clench plate with an inner apertured plate secured in spaced relation thereto and to clench the longer prongs 19 inwardly between the plates. This type of construction is relatively costly and has limited holding power since the attaching prongs are turned inwardly more or less along the curved paths which they would normally follow if they were pulled loose from the clench plate. As a result the prongs are rather easily pulled out of clenched relation with the plates when a separating force is applied to separate the stud and socket, especially at the three locking sides.

The device of the present invention eliminates the need for a double plate construction and provides instead a single clench plate 16 similar in shape to but larger than the plates 13 and 15. The plate 16 is formed with a reversely turned peripheral flanged portion 27 forming a pocket 28 designed to receive the outwardly turned ends of the prongs 19. Inwardly of the pocket 28 the material of the clench plate is pressed inwardly as shown at 29 to form an outwardly curved anvil portion 30 and an adjoining raised rib portion 31. The curved anvil portion 30 serves to bend the prongs 19 outwardly and guide them into the pocket 28 in which they are clenched by the flange 27 when the socket elements are assembled with a carrying part 14. The raised rib portion 31 together with the peripheral flanged portion 27 serves to compress the material of the carrying member against the plate 13, thereby gripping it firmly and minimizing any possibility of tearing when it is pierced by the prongs.

As a result of this construction the prongs 19 are disposed outwardly out of the paths which they would normally follow in being pulled loose from the clench plate so that any separating force exerted in trying to separate the stud from the socket will urge the clenched portions of the prongs 19 into firmer engagement within the pocket 28, thereby minimizing the possibility of their pulling loose. A further feature adding to the strength and durability of the construction resides in the shaping of the prongs. In accordance with the invention the prongs are made V-shaped in cross-section or otherwise ribbed so as to have greater resistance to bending and are preferably pointed on the ends for easy piercing of the carrying part 14 without undue disruption or breaking of the fibres thereof.

By virtue of the particular arrangement of the apertures 24 and 25, the jaws 20 and 21 and the curb 26, the stud 1 may be disengaged from the socket only when it is tilted downwardly away from the curb 26. When the stud is so tilted the beveled shoulder 7 of the stud spreads the jaws 20 and 21 apart thus releasing the head of the stud. Tilting in other directions is prevented by the edges of the material around the openings 24 and 25 and the curb 26, thereby preventing spreading of the jaws 20 and 21 to release the head of the stud. The fastener of the invention thus constitutes a snap fastener of the so-called three-side lock type.

It will be apparent that the present invention provides an improved and simplified three-side lock snap fastener of increased holding power and strength which will not pull loose under the most severe conditions of use to which it may be subjected.

Although I have illustrated and described a preferred embodiment of the invention, I do not intend to be limited thereto as the scope of the invention is best defined in the appended claim.

I claim:

A three-side lock snap fastener socket assembly comprising a supporting sheet, a three-side lock socket member assembled on one side of the sheet, and a one-piece clench plate assembled on the other side, said clench plate having a continuous peripheral rim curling inwardly to provide a continuous peripheral recess and an outwardly inclined camming surface disposed inwardly from the recess, said socket member comprising a pair of spaced plates having aligned stud-receiving openings disposed therein and means between the plates for engaging the head of an inserted stud, the outermost of the plates having prongs extending therefrom through prong-receiving openings in the other plate to pierce the supporting sheet and terminate in ends which are curled outwardly on the camming surface into the recess, the portion of the supporting sheet between the clench plate and the socket member being imperforate except where pierced by the prongs, said prongs being V-shaped in cross-section to provide substantially rigid portions penetrating said supporting sheet and to provide substantially unyielding free end portions in continuous engagement with said camming surfaces and said clench plate within said peripheral rim securing said socket member to said clench plate.

References Cited in the file of this patent

UNITED STATES PATENTS

| Number | Name | Date |
|---|---|---|
| 1,387,102 | Carr | Aug. 9, 1921 |
| 1,480,531 | Carr | Jan. 8, 1924 |
| 1,685,063 | Carr | Sept. 18, 1928 |
| 1,699,486 | Carr | Jan. 15, 1929 |
| 2,235,168 | Reiter | Mar. 18, 1941 |
| 2,332,167 | Reiter | Oct. 19, 1943 |